United States Patent [19]
Podrazhansky et al.

[11] Patent Number: 5,889,385
[45] Date of Patent: Mar. 30, 1999

[54] EQUALIZATION OF SERIES-CONNECTED CELLS OF A BATTERY USING CONTROLLED CHARGING AND DISCHARGING PULSES

[75] Inventors: Yury M. Podrazhansky, Alpharetta; Mikhail M. Podrazhansky; Yefim Y. Kusharskiy, both of Norcross, all of Ga.

[73] Assignee: Advanced Charger Technology, Inc., Norcross, Ga.

[21] Appl. No.: 914,674

[22] Filed: Aug. 19, 1997

Related U.S. Application Data

[60] Provisional application No. 60/046,605 May 15, 1997.
[51] Int. Cl.$^6$ ....................................................... H02J 7/00
[52] U.S. Cl. ............................ 320/130; 320/150; 320/160
[58] Field of Search ................................... 320/130, 129, 320/132, 133, 188, 119, 139, 151, 152, 153, 160, 162

[56] References Cited

U.S. PATENT DOCUMENTS

| | | | |
|---|---|---|---|
| 4,211,969 | 7/1980 | Steigerwald | 320/129 |
| 4,829,225 | 5/1989 | Podrazhansky et al. | 320/129 |
| 5,153,496 | 10/1992 | LaForge | 320/119 |
| 5,307,000 | 4/1994 | Podrazhansky et al. | 320/129 |
| 5,481,174 | 1/1996 | Martin et al. | 320/129 |
| 5,499,234 | 3/1996 | Rider et al. | 320/132 |
| 5,523,667 | 6/1996 | Feldstein | 320/118 |
| 5,646,504 | 7/1997 | Feldstein | 320/119 |
| 5,694,023 | 12/1997 | Podrazhansky et al. | 320/129 |

OTHER PUBLICATIONS

D. Ouwerkerk, "Battery monitoring, charging and balancing apparatus", Journal of Power Source, vol.; 66, Issue 1–2, p. 188, May 6, 1997.

Primary Examiner—Peter S. Wong
Assistant Examiner—Gregory J. Toatley, Jr.
Attorney, Agent, or Firm—Smith, Gambrell & Russell LLP; Charles L. Warner, II, Esq.

[57] ABSTRACT

A charge pulse (200A) is applied to the battery (B). The open circuit voltage of each cell (C1–CN) is then measured during a first rest period (210A). A depolarization pulse (220A) is then applied to the battery. The open circuit voltage of each cell is then measured during a second rest period (210B). The open circuit voltages for the first and second rest periods for each cell are compared to yield a voltage difference (DELTA Y). This voltage difference is then compared with a threshold voltage (V THRESHOLD). If the voltage difference is greater than the threshold voltage then the cell is being charged too rapidly, or is being overcharged, so one or more of the charge cycle parameters are adjusted. Some of the charge cycle parameters are, for example, the charge pulse current amplitude, the charge pulse duration, the number of consecutive charge pulses, the depolarization pulse current amplitude, the depolarization pulse duration, the number of consecutive depolarization pulses, the duration of the rest periods, or a combination of these. Multiple charge pulses (200A, 200B) and depolarization pulses (220A, 220B, 220C) may also be used. These parameters may be adjusted for the battery as a whole and/or for each cell individually. The adjustment to the charge cycle parameters may also be made on a "worst case" or a "best case" cell basis, with this cell controlling the charge cycle parameters for all the cells. Several techniques for adjusting the charge cycle parameters are disclosed.

13 Claims, 4 Drawing Sheets

EQUALIZATION OF SERIES-CONNECTED CELLS OF A BATTERY USING CONTROLLED CHARGING AND DISCHARGING PULSES

CROSS REFERENCE TO RELATED APPLICATION

This application claims the priority of U.S. Provisional Patent Application No. 60/046,605, filed May 15, 1997, by Yury Podrazhansky et al., and entitled "Method And Apparatus For Equalizing In Sequence Connected Batteries".

TECHNICAL FIELD

This invention relates to determining the state of charge of each cell in a battery of series-connected cells and independently adjusting the charging process of each cell so that each cell is fully charged and no cell is overcharged or undercharged, and similarly for batteries in a battery pack.

BACKGROUND OF THE INVENTION

An individual battery cell has a rather low voltage, typically in the range of 1 to 4.2 volts. This low voltage is quite suitable for some purposes, such as small flashlights, watches, handheld calculators and personal radios. However, a single cell is inadequate for uses which have higher voltage and/or current requirements, such as forklifts, golf carts, electric vehicles, electrically started vehicles, and uninterruptable power supply (UPS) systems. For example, automobiles typically require 6 or 12 volts, some diesel powered vehicles require 24 volts, UPS systems require 120 or 240 volts, and some other systems require even higher voltages. The battery cells are connected in series to achieve these higher voltages.

All cells are not identical, and all batteries are not identical. Rather, the particular purity of the materials used, the temperature during construction, and the placement of the plates in a cell cause each cell to be unique. Further, even when cells are constructed with materials from a single batch, constructed at the same time, and constructed with the same tolerances so as to be as closely matched as possible, the subtle differences in these variables cause the cells to become less similar as time passes. As a result, at some point the different cells may have such different states of charge that one or more cells may be fully charged but other cells may have minimal or no charge. When a cell finally reaches the point that it is discharged but the other cells are still at least partially charged, further use of the series-connected cells will cause the discharged cell to be subjected to a reverse polarity voltage, which can cause further deterioration of that cell, overheating, gassing, or even an explosion.

The construction of batteries in a compact, efficient volume dictates that the cells cannot stand isolated from one another. Rather, the cells are placed against each other. When more than two cells are involved, this usually results in some cells being on the outer portion of the battery and some cells being on the inner portion of the battery. The cells on the outside of a battery are able to dissipate heat by conduction to a cooling structure if available, or by convention (forced or natural). However, the cells on the inside of a battery are rather insulated and receive less cooling. An inner cell may be able to dissipate some heat via the top and bottom surfaces of the cell, but these surface areas are rather small and therefore have limited heat dissipation capability. An inner cell also has sides, which have larger surface areas, but these are in contact with other cells. Therefore, in order for an inner cell to dissipate heat via the outer cells the inner cell must be at a higher temperature than the outer cells. Thus, during heat-generating operations, such as charging, the inner cells will be at a higher temperature than the outer cells. Thus, the particular environment in which a cell is used can cause a cell to become more and more different from other, once-similar cells.

Likewise, batteries may be connected in series and/or in parallel, as needed to obtain the desired output voltage and energy storage capacity. Similarly, the assembly of a set of batteries in a compact, efficient volume for a battery pack, such as a battery power supply or an uninterruptible power supply, dictates that the batteries cannot stand isolated from one another. Rather, the batteries are placed in close proximity to or against each other, with some of the batteries being on the inside of the battery pack, and some of the batteries being on the outside of the battery pack. Similarly as with cells, the batteries toward the inside of the battery pack have less heat dissipating capability than the batteries toward the outside of the battery pack. Therefore, in order for an inner battery to dissipate heat via the outer batteries the inner battery must be at a higher temperature than the outer batteries. Thus, during heat-generating operations, such as charging, the inner batteries will be at a higher temperature than the outer batteries. However, batteries on the outside of the battery pack may also be subjected to greater and more rapid extremes in temperature than the batteries which are on the inside of the battery pack and are therefore somewhat insulated from the surrounding environment. Likewise, similar batteries experience different environments. For example, one 12 volt battery may be a year older than another 12 volt battery and may have been subjected to more or fewer charge/discharge cycles, more or fewer deep discharge cycles, higher or lower temperature extremes, etc.

Therefore, it is more likely than not that the temperature, the internal impedance, and the state of charge will be different from battery to battery in a battery pack and will be exaggerated as the batteries undergo aging, temperature cycling, and charging/discharging cycles. Thus, at some point, one of the batteries will reach a state of zero charge when others of the batteries still have substantial charges. Further discharging of the battery pack will cause the battery with zero charge to be subjected to a reverse polarity voltage, with the same consequences for that battery as described above for an individual cell which is reverse charged.

At 90% of full charge, a cell will not readily accept a high charging rate. Therefore, if the charging current is set so as to rapidly charge the weakest cell, the charging current will be too high for a more fully charged cell and damage can be done to the more fully charged cell. However, if the charging current is reduced to prevent damage to the more fully charged cell then the charging process will take a much longer time. For example, if each battery in a battery pack has a full-charge rating of 12 volts and 200 ampere-hours, all batteries but one are fully charged, and this one battery has a state of charge of only 90% of full charge, then 20 ampere-hours of charging current must be applied to that battery to bring it to a full charge. To accomplish this, a 20 amp charge could be applied for 1 hour, or a 40 amp charge could be applied for 30 minutes, or a 160 amp charge applied for 7.5 minutes, etc. However, the fully charged batteries may not accept the 160 amp charging current, or even the 40 amp charging current, without overheating, gassing, or damage. Therefore, to avoid damage to the fully charged batteries during the equalization process, the charging current must be limited to 20 amperes, or less, and the charging time must be extended to 1 hour, or more, to add enough charge to the lesser charged battery to bring it to the same full charge level as the other batteries.

As a result, each cell becomes a unique component, with its own output voltage, energy storage capacity, internal resistance, leakage rate, and maximum charging rates and conditions. Thus, the cells in a battery, and the batteries in a battery pack, perform differently than other cells or batteries, and these differences change as the battery is aged and is used. Therefore, each cell, and each battery, has its own, unique set of charging and discharging parameters.

Thus, the differences in the individual cells, and the differences the individual batteries, and the differences in heat dissipating capability, can easily result in temperature differences of 20 degrees Fahrenheit (11 degrees Celsius).

Electric vehicles, hospitals, aircraft, ships, power production stations, airport towers and radars, telephone central offices and relay stations, radio stations, television stations, and other systems require battery packs, either as a primary power source or as a backup power source, such as in a UPS. In some cases, the battery pack may comprise dozens of batteries connected in series-parallel configurations.

Lithium batteries are particularly sensitive to overcharging. If a Lithium battery is seriously or repeatedly undercharged or overcharged then its lifetime will be greatly shortened. If a lithium battery is overcharged then irreversible dissolution of electrolyte will occur involving oxygen and heat evolution. Likewise, if a lithium battery is over discharged, such as may occur due to undercharging before use, then nickel or cobalt (depending upon the construction of the battery) will be deposited onto the carbon electrode. This is an irreversible chemical reaction which reduces the lifetime of the battery. For example, the charge-discharge cycle lifetime of a lithium battery capable of 1000 charge-discharge cycles may be reduced to as few as 10 charge-discharge cycles. A lithium battery is currently more expensive than even a silver-zinc battery. Thus, undercharging and overcharging can be expensive. Therefore, care must be taken that a lithium battery is neither overcharged nor undercharged in order to avoid this life-cycle shortening and reduce the maintenance costs of systems involving lithium batteries.

In any battery, and in any battery pack, regardless of the type, the likelihood that one or more of the cells will be undercharged or overcharged depends upon the number of cells connected in series. The larger the number of series-connected cells, the greater the likelihood that one or more of the cells will be undercharged or overcharged. Some companies attempt to alleviate this problem by matching the cells in a battery or the batteries in a battery pack. This matching is generally done by measuring the open circuit voltage of each fully charged battery or by measuring the internal resistance of each fully charged battery. However, this procedure is expensive and time-consuming. Further, this procedure does not compensate for differences that arise due to aging or environment.

The problem, undercharging or overcharging, is compounded by series-parallel configurations. One series of cells or batteries may have a higher voltage than another series. The higher voltage series will then supply current to lower voltage series. This reduces the charge on the higher voltage series and increases the charge on the lower voltage series. This can cause over discharging or reverse charging of cells in the higher voltage series, and overcharging of cells in the lower voltage series. In addition to damaging some of the cells, this process also results in the overall configuration having less capacity.

Overcharging a cell causes overheating, loss of electrolyte, and gassing. Further, in the last stages of the charging process, the cell is nearly charged and cannot accept as large a charging current as it did when it was only slightly charged. Thus, a cell can be damaged by overheating, loss of electrolyte, and gassing even when the cell is not yet fully charged. In either case, if the charging process continues without modification then the cell will become seriously damaged. Excessive gas production in a sealed cell also shortens the lifetime of the cell by drying out the separator. In lead-acid cells, overcharging shortens the lifetime of the cell by loss of electrolyte, and also cause ozone production which corrodes the cell and causes other changes in the cell chemistry.

A cell which is at a higher temperature can accept a larger charge current and provide a larger load (discharge) current than a cell which is at a lower temperature. Thus, when cells are connected in series, but are not at the same temperature, one cell may be charged at the optimum rate, given its temperature, while other cells may by undercharged or overcharged, thus leading to damage to the cell and/or reduced capacity for the battery.

Also, the internal impedance will be different from one battery to another. The internal impedance depends upon the state of charge of the battery, the temperature of the battery, the amount of electrolyte present, the amount of water in the electrolyte, and the state (deterioration) of the electrodes. A good battery will have a lower impedance when fully charged and a higher impedance when fully discharged. The more that the charging voltage exceeds the battery voltage, the more the current that will be forced into the battery. If the amount of current forced into the battery exceeds the current that the battery can use for charging then the excess current will cause electrolysis of the battery water, gassing, and heating of the battery. Therefore, when a charging current is applied to a battery pack greater heating will occur in a more fully charged battery than the heating in a lesser-charged battery. The states of charge between different batteries may be somewhat equalized by continuing to apply a charge to the battery pack even though some of the batteries have already been completely charged. However, gassing as well as overheating of these more fully charged batteries may occur. Furthermore, if high a current pulse charging technique is used then the application of a large charging current pulse to a fully charged battery may cause damage to or catastrophic failure of the battery.

Therefore, to maximum the lifetime and capacity of a battery or battery pack, it is necessary to accurately determine the state of charge of individual cells in a battery and then to equalize the charges on the individual cells. Equalization is the process whereby all of the cells or batteries are brought to the same state of charge. Equalization is very important because it prevents the application of a reverse polarity voltage to a battery.

Some examples of procedures for measuring the state of charge or equalizing the charges are shown in the following U.S. Pat. Nos. 3,979,658; 3,980,940; 4,238,721; 4,242,627; 4,562,398; 4,331,911; 5,498,490; 4,502,000; 5,528,122; 5,504,415; 5,594,320; and 5,592,067.

SUMMARY OF THE INVENTION

The present invention provides a method and an apparatus for accurately determining the state of charge of an individual cell in a battery so that the charge across the several cells in the battery may be equalized.

The present invention applies a charging pulse, waits for a first rest period during which the open circuit voltage of the cell is measured, applies a depolarization pulse, and then waits for a second rest period during which the open circuit voltage of the cell is again measured. The open circuit voltages for the first and second rest periods for the cell are compared to yield a voltage difference. This voltage difference is then compared with a threshold voltage. If the voltage difference is greater than the threshold voltage then the cell is being charged too rapidly, or is being overcharged, so the rate of charging is adjusted. The rate of charging is adjusted by altering one or more of the charge cycle parameters, such as the charge pulse current amplitude, the charge pulse duration, the number of consecutive charge pulses, the depolarization pulse current amplitude, the depolarization pulse duration, the number of consecutive depolarization pulses, the rest period duration, or a combination of these.

The present invention determines the state of charge of each cell. The adjustment to the rate of charging may be made on an individual cell basis, that is, tailored to each cell. The adjustment to the rate of charging may also be made on a "worst case" or a "best case" cell basis, depending upon which charge cycle parameters have been selected for adjustment. The adjustment to the charge cycle parameters may also be made for all cells while further adjustments are made for specific cells.

Other objects, features, and advantages of the present invention will become apparent upon reading the following description of the preferred embodiment, when taken in conjunction with the drawings and the claims.

DETAILED DESCRIPTION OF THE INVENTION

Figure 1:
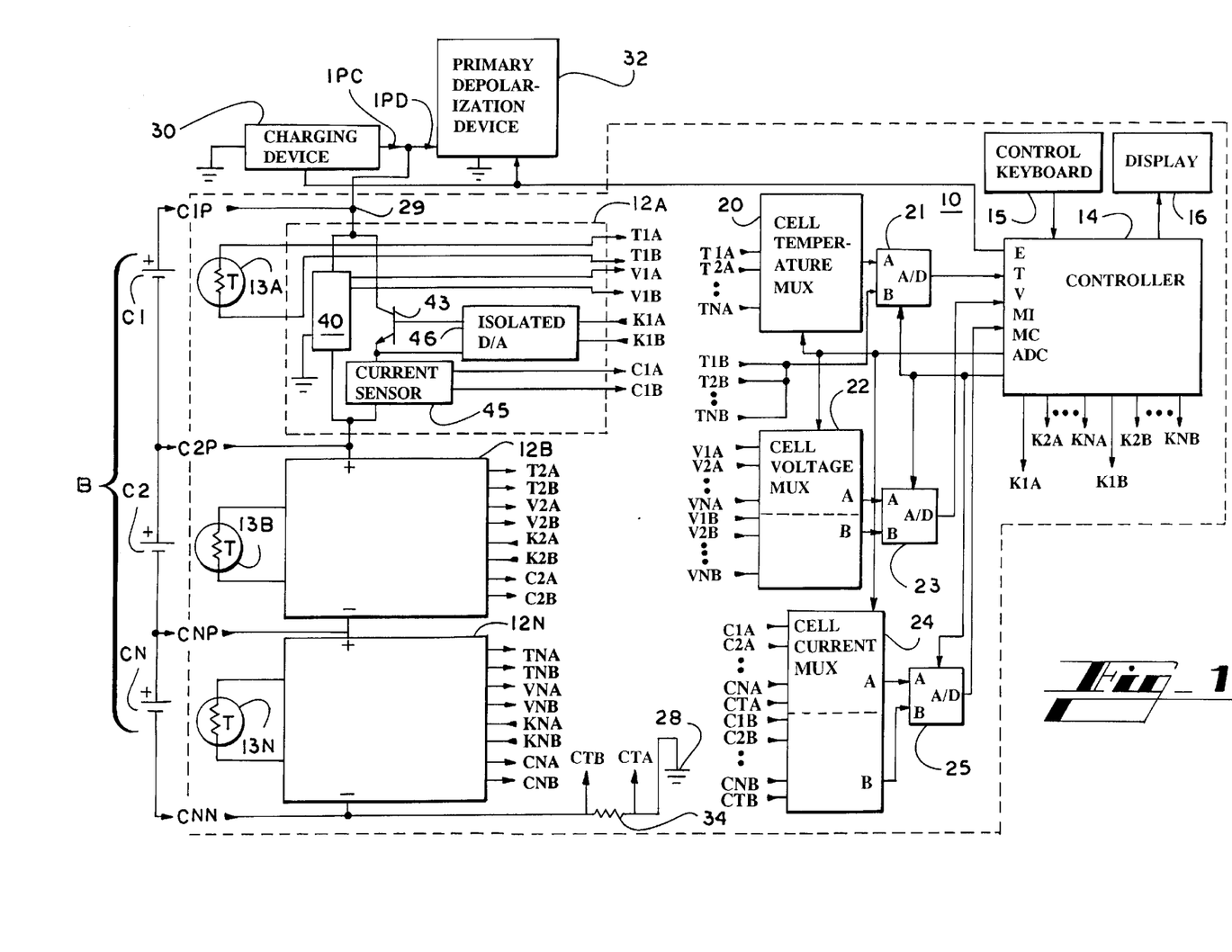
FIG. 1 is a block diagram of the preferred embodiment of the present invention.

FIG. 1 is a block diagram of the preferred embodiment of the present invention. The preferred embodiment of the present invention 10 comprises a plurality of modules 12A–12N associated with respective cells C1–CN, the modules 12 controlling the charging and depolarizing on a per cell basis and providing information regarding the state of charge of each cell, a plurality of temperature sensing devices 13A–13N associated with respective cells C1–CN, the sensing devices 13 providing information regarding the temperature of each cell, a controller 14 which uses the information to determine the state of charge of each cell and determine the appropriate charging current for a particular cell, an optional control keyboard 15 to allow an It operator to input information regarding the cells, a display 16 to indicate the state of charge of the cells C1–CN, and, optionally, the selections made by the operator.

Consider first the battery B comprising the plurality of series-connected cells C1–CN. Each cell C has an associated temperature measuring device 13 and an equalizing module 12. The equalizing modules 12 are, like the cells C, connected in series. Each equalizing module 12 is connected in parallel with its associated cell C. The positive terminal of cell C1 is connected, via connection C1P and node 29, to the positive terminal of module 12A, the charging circuit 30, and the primary depolarization device 32.

The negative terminal of module 12A is connected to the positive terminal of module 12B and also, via connection C2P, to the negative terminal of cell C1 and to the positive terminal of cell C2. Similarly, other cells and modules may be added in series so that the next to last module is connected to the positive terminal of module 12N and, via connection CNP, to the negative terminal of the next to last cell and to the positive terminal of cell CN. Finally, the negative terminal of cell CN is connected via connection CNN to the negative terminal of module 12N and one input of a current sensing resistor 34. The other end of resistor 34 is connected to a circuit ground or return at node 28.

Controller 14 is microprocessor-based and contains a microprocessor, a read only memory, a random access memory, and input/output peripheral devices. The design and construction of a microprocessor-based controller, such as controller 14, is, in general, well known.

Modules 12A–12N have output lines T1A–TNA and T1B–TNB connecting temperature sensing devices 13 to controller 14 so that the temperature of each individual cell C may be measured. Modules 12A–12N also have cell voltage output lines V1A–VNA and V1B–VNB to allow controller 14 to determine the voltage across each cell C, current outputs C1A–CNA and C1B–CNB to allow controller 14 to determine the portion of the charging current being shunted around each cell C or the additional depolarization current being drawn from each cell C. Control lines K1A–KNA and K1B–KNB allow controller 14 to control the portion of the charging current being shunted around each cell C or the additional depolarization current being drawn from each cell C.

The charging circuit 30 may be any charging circuit which can provide a charging pulse which has an adjustable amplitude or an adjustable duration, and preferably both. An example of such a charging circuit is described in U.S. Pat. No. 5,307,000. The primary depolarization device 32 may be any current sink circuit which can provide a depolarization pulse which has an adjustable amplitude or an adjustable duration, and preferably both. An example of such a depolarization circuit 32 is a transistor and a D/A converter, such as in a module 12, but which are rated to withstand the higher voltage provided by the battery B. Control lines E allow the controller 14 to control the charging device 30 and the primary depolarization device 32.

Temperature sensing devices 13A–13N, which may be thermistors, infrared sensors, etc., are attached to or otherwise thermally connected to cells C1–CN, respectively, so as to provide an indication of the temperature of the associated cell. Cell temperatures change slowly so it is permissible to sample the temperature of a cell at selected intervals, such as every few seconds. To reduce the cost and the number of components required, the outputs T1A–TNA are connected to the inputs of a cell temperature multiplexer 20. The output of multiplexer 20 is connected to one input (A) of an analog-to-digital (A/D) converter 21. The T1B–TNB outputs of thermistors 13A–13N are all connected together and are connected to the other input (B) of A/D converter 21. The output of A/D converter 21 is connected to the temperature T input of controller 14. Controller 14 controls which cell temperature is being monitored at any point in time via the multiplexer control (MC) output and controls the conversion process via its analog-to-digital converter (ADC) control output.

Likewise, the cell voltage outputs V1A–VNA and V1B–VNB are provided through a cell voltage multiplexer 22 to the A and B inputs of an A/D converter 23, the output of which is responsive to the voltage difference at its A and B inputs and is connected to the voltage V input of controller 14. In addition, current outputs C1A–CNA and C1B–CNB and the total current outputs CTA and CTB are provided through a cell current multiplexer 24 to the A and B inputs of A/D converter 25, the output of which is responsive to the voltage difference at its A and B inputs and is connected to the current input MI of controller 14. It will be noted that resistor 34 is in series with the cells C and therefore the voltage developed across resistor 34 indicates the primary charge current IPC being supplied to the cells C and the primary depolarization current IPD being drawn from the cells C.

It should be noted that the primary charge current IPC being supplied to the cells C only indicates the maximum charge current that may be provided to a cell C, and not the actual current, because the transistor 43 in a module 12 may turned on to some extent and shunting some of the primary charge current around its associated cell C. It should also be noted that the primary depolarization current IPD is not dependent upon the individual cell depolarization currents because the primary depolarization device 32 may be off and so there is no current flow through resistor 34, even though the transistor 43 in one or more of the modules 12 is turned on to some extent.

If the controller 14 is sufficiently fast then it will determine the state of charge of each cell C between charge pulses. However, if this is not the case, then the information for one cell may be determined after one charge pulse, the information for another cell may be sampled after the next charge pulse, and so forth so that the information for a given cell C is sampled every several pulses. The cell characteristics have a fast response and will vary on a pulse-to-pulse basis, but any damage to a cell C occurs at a slower rate. Sample and hold circuits (not shown) may be used between the modules 12 and the inputs to current multiplexer 24 so that information for all cells at a single point in time may be obtained by controller 14. Controller 14 preferably monitors the open circuit voltage of each cell C during rest periods and dynamically adjusts the charging/equalization process for each cell C. In the preferred embodiment, controller 14 controls the equalization process by controlling one or more of the charge cycle parameters.

The construction of a module, such as module 12A, is described in detail in U.S. Pat. No. 5,504,415. Briefly stated, module 12A contains: a voltage divider circuit 40 which is connected to circuit ground and, via terminals C1P and C2P, across cell C1 so as to provide a divided cell voltage on output lines V1A and V1B; an NPN transistor 43 connected in series with a current sensor 45; and a D/A converter 46. This combination of transistor 43 and current sensor 45 is connected via terminals C1P and C2P across cell C1. When a charging current is being applied it will flow into cell C1 and transistor 43. Transistor 43 is generally not turned completely on at any time but is turned on to the desired degree, for the desired duration, and at the desired time, to shunt the desired amount of charging current or draw the desired amount of depolarization current. Transistor 43 is turned on during a charge pulse to shunt the desired amount of the charging current around the cell C1. Transistor 43 is turned on during a depolarization pulse to draw the desired amount of the depolarization current from the cell C1.

The current outputs C1A and C1B of current sensor 45 provide an indication of the current drawn by transistor 43 and thereby shunted around cell C1. This allows controller 14 to adjust the amount of base drive provided to transistor 43 so as to precisely control the amount of current drawn by transistor 43. The K1A and K1B outputs of controller 14 are provided to the inputs of an isolated digital-to-analog (D/A) converter 46. The outputs of D/A converter 46 are provided to the base and emitter of transistor 43 so as to turn on transistor 43 to the desired degree. D/A converter 46 is "isolated" in that it provides electrical isolation between the lower voltages used for operation of controller 14 and the higher voltages present on transistor 43 when cells C are connected in series.

The present invention has devices 34, 45, 24 and 25 for measuring the current supplied to or drawn from individual cells as well as for the series combination of cells, voltage measurement devices 40, 22 and 23 for measuring the voltage across individual cells, temperature measuring devices 13, 20 and 21 for measuring the temperature of each cell, and a controller 14 responsive to the state of charge of each individual cell for adjusting the charging process.

The present invention measures the voltage of each cell during the rest periods surrounding a depolarization pulse. The controller 14 uses this information to determine the state of charge of each cell, and of the series combination of cells, and adjusts the charging process to match the existing state of each of the cells so that the charges in the cells may be equalized without interrupting the charging process. In the preferred embodiment, the equalization process is performed simultaneously with and as part of the charging process. That is, controller 14 measures the voltage across each cell to determine the state of charge and condition of each cell and then adjusts the charging process so as to properly charge that cell. For example, if the charging current being applied is 100 amps but cell C1 only needs 10 amps for proper charging then controller 14 will cause transistor 43 of module 12A to shunt more and more current around cell C1 until cell C1 is within acceptable limits, which in this example means that transistor 43 will be shunting 90 amps of the charging current around cell C1. Thus, overcharging of and damage to cell C1 is prevented, but the full 100 amps of charging current is provided to another cell which is undercharged and needs the full 100 amps to properly charge.

In the preferred embodiment, controller 14 displays and periodically updates the state of charge of the cells so that the operator is continually informed the available energy stored in the cells. The status display advises of the voltage of the series combination of cells, the temperature of each cell, and the relative states of charge among the different cells.

In the preferred embodiment, the equalization process is automatically performed whenever charging is being performed. This serves to maintain all the cells in a proper state of charge and prevents any cell from being undercharged with respect to the rest of the cells.

Although transistor 43 is shown as a bipolar transistor, it will be appreciated that field effect transistors and other types of power semiconductors may be used instead.

Although cells are shown, this is purely for convenience of illustration and discussion and it should be appreciated that cells, batteries, and battery packs, are all rechargeable energy storage devices. Therefore, where a cell, such as cell C1, is shown, a battery may be substituted therefor so as to form a battery pack from series-connected batteries, instead of forming a battery from series-connected cells.

Figure 2:
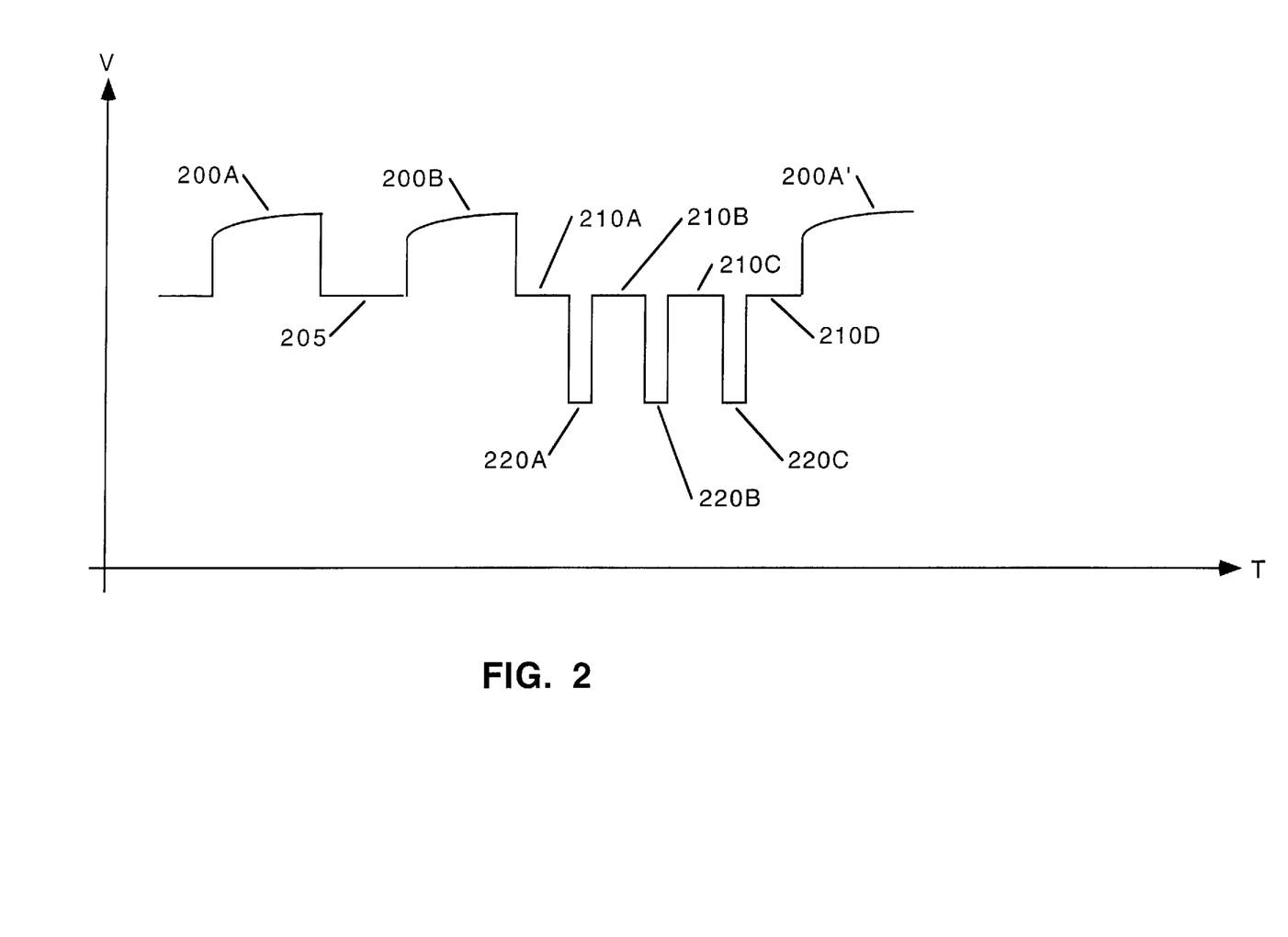
FIG. 2 is a waveform illustrating the method of determining the state of the charge of a cell.

FIG. 2 is a waveform illustrating the method of determining the state of the charge of a cell, for example, cell C1.

One or more charging pulses 200A, 200B, etc., are applied to the cell. If there are two or more charging pulses they are separated by one or more corresponding charging rest periods 205. In the preferred embodiment, only a single charge pulse 200A is used. After the charge pulse (or charge pulses) 200, there is preferably a first rest (waiting) period 210A, followed by a first depolarization pulse 220A, followed by second rest period 210B. Additional depolarization pulses 220B, 220C, etc. and waiting periods 210C, 210D, etc., may also be used. The use and benefits of multiple depolarization pulses are described in U.S. Pat. No. 5,307,000. In the preferred embodiment, only a single depolarization pulse 220A is used. This charging cycle (200, 205 if appropriate, 210, 220) is then repeated beginning with another charging pulse 200A'.

The beginning part of any discharge pulse performs a depolarization function. Therefore, a depolarization pulse is a discharge pulse, although preferably of a very short duration so that the cell is discharged only enough to perform the desired depolarization function. Longer discharge pulses also perform the depolarization function but longer pulses unnecessarily drain stored energy from the cell. However, longer pulses may be used to drain energy from a cell and thereby equalize the stored charge in that cell with the storage charge in another cell or cells.

The state of charge of the cell is determined by measuring the open circuit (no load) voltage of the cell during the two rest periods 210 surrounding a depolarization pulse 220. For example, rest periods 210A and 210B surrounding depolarization pulse 220A may be used, or rest periods 210B and 210C surrounding depolarization pulse 220B may be used. It is also possible to go from a charge pulse 200 to the first depolarization pulse 220A with little or no intervening rest period 210A. In this case, the rest periods 210B and 210C surrounding depolarization pulse 220B could be used, or the rest periods 210C and 210D surrounding depolarization pulse 220C could be used.

For best accuracy in determining the state of charge of a cell, it is preferred to use the two rest periods which surround the first depolarization pulse 220 after the end of the charge pulses 200. Therefore, if rest period 210A is present, then the voltage measurements would preferably be taken during the rest periods 210A and 210B. If rest period 210A is not present, then the voltage measurements would preferably be taken during the rest periods 210B and 210C. Further, in the preferred embodiment, the temperature of the cell, or at least the battery, is measured periodically. A cell, or a battery, is a large mass item and does not change temperature instantaneously. Therefore, the temperature is preferably measured at least every one or two minutes.

The measurement of the open circuit battery voltage during the two rest periods 210 surrounding a depolarization pulse 220 provides information as to the ion transport capability of the cell. The ion transport capability indicates the ability of the cell to accept a charge current. This provides for more precise control of the charge current and the ability of the cell to accept a charge current. The difference between the voltage during a first rest period (for example, 210A) and the voltage during a second (next) rest period (for example, 210B) indicates the ion transport capability of the cell and therefore the gas production rate of the cell. As a result, the rate of charging can be properly adjusted to prevent loss of electrolyte by gassing. This is especially important during the last part of the charge process because the cell is nearly charged and will not readily accept as large a rate of charging as it did when it was only slightly charged. Normally, if charging is proceeding properly, the voltage measurement taken during the first rest period (the first voltage measurement) will be about the same as the voltage measurement taken during the second rest period (the second voltage measurement). Therefore, the first voltage measurement is compared, such as by subtraction, with the second voltage measurement to determine the voltage difference DELTA Y. This voltage difference does not exist until an ion transport problem occurs. when an ion transport problem occurs the voltage measurements will be not the same. The voltage measurement during a first rest period will be greater than the voltage measurement during a second rest period. This voltage difference measurement DELTA Y is then compared with a voltage difference threshold value (V THRESHOLD) to determine whether the cell may be charged more rapidly (the voltage difference DELTA Y does not exist or is less than V THRESHOLD), or whether the cell is being charged too rapidly or is being overcharged (the voltage difference DELTA Y is larger than V THRESHOLD). Therefore, DELTA Y provides the information used to determine the ability of the cell to accept a charging current. In the preferred method, the voltage difference DELTA Y is compared with the appropriate V THRESHOLD based upon the cell type, the cell rating, and the cell temperature. The V THRESHOLD value is determined empirically by measuring the gas production rate for different types of cells which have a known capacity rating, a known state of charge, and a known temperature. Of course, the type of cell being charged should be known because the threshold value for a cold, small capacity lithium cell will be different than the threshold value for a hot, high capacity lead-acid cell.

Once the state of charge of a cell is known, then action can be taken to equalize the state of charge and the ability of that cell to accept current with the state of charge of the other cells. The present invention provides several methods of equalizing the state of charge, and the ability to accept current, among the cells.

In one method, the voltage difference DELTA Y is compared with the appropriate threshold voltage V THRESHOLD (based upon cell type, the cell rating, and the cell temperature) for each cell. If DELTA Y is larger than the V THRESHOLD value then too much charge current is being applied to the cell and the charge current applied to the cell should be reduced. The charge current provided to a cell is reduced by shunting some or more of the charge current around that cell. If DELTA Y is smaller than the V THRESHOLD value then the cell is not being charged at its maximum rate, which may lead to undercharging or to a prolonged charging time, so not enough charge current is being applied to the cell and the charge current applied to the cell should be increased. Therefore, each cell is provided a charging current at the maximum rate that it will readily accept.

In another method, the voltage difference DELTA Y is determined for each cell and then the cell with the largest DELTA Y is determined, the "worst case" cell. This largest DELTA Y is then compared with the appropriate V THRESHOLD (based upon cell type, rating, temperature). If this largest DELTA Y is larger than the V THRESHOLD value then too much charge current is being applied to the worst case cell and the charge current applied to the battery should be reduced. The amplitude of the charge current provided to the battery may be reduced by reducing the charge voltage used to force the charge current into the battery. The total charge current may also be reduced by reducing the duration of the charge pulse. This method is simpler than the first method in that it measures the state of charge of each cell but adjusts the charging current provided to all the cells, that is, to the battery as a whole, rather than adjusting the charging current on a cell-by-cell basis. This method is also more efficient because all of the charge current goes into the cells, rather than some of the charge current being shunted around a cell. The disadvantage is that all cells are charged at the rate determined by the cell which accepts the charge at the slowest rate.

In another method, the voltage difference DELTA Y is determined for each cell and then the worst case cell is determined. This largest DELTA Y is then compared with the appropriate V THRESHOLD value (based upon cell type, rating, temperature). If this largest DELTA Y is larger than the V THRESHOLD value then too much charge current is being applied to the worst case cell and the charge current applied to the battery should be reduced. The charge current provided to the battery may be reduced by reducing the number of charge pulses 200. For example, if two consecutive charge pulses 200A, 200B are provided before a depolarization pulse 220 is applied, then the number of charge pulses may be lowered to one charge pulse 200A before other methods are used.

In another method, if the voltage difference DELTA Y is larger than the V THRESHOLD value then too much charge current is being applied to the cell. Therefore, the cell should be discharged more, between charge pulses, so as to reduce or even temporarily reverse the rate of charging of the cell. This is accomplished by increasing the current drawn during a depolarization pulse 220. This may be done on at the individual cell level, where the depolarization pulse current is adjusted independently for each cell. This may be also done at the battery level, where the worst case cell is determined and the depolarization pulse current for all the cells is based upon the depolarization pulse current requirement for the worst case cell.

In still another method, if the voltage difference DELTA Y is larger than the V THRESHOLD value then too much charge current is being applied to the cell. Therefore, the cell should be discharged more, between charge pulses, so as to reduce or even temporarily reverse the rate of charging of the cell. This is accomplished by increasing the duration of a depolarization pulse 220. This may be done on at the individual cell level, where the depolarization pulse duration is adjusted independently for each cell. This may be also done at the battery level, where the worst case cell is determined and the depolarization pulse duration for all the cells is based upon the depolarization pulse duration requirement for the worst case cell.

In still another method, if the voltage difference DELTA Y is larger than the V THRESHOLD value then too much charge current is being applied to the cell. Therefore, the cell should be discharged more, between charge pulses, so as to reduce or even temporarily reverse the rate of charging of the cell. This is accomplished by increasing the number of depolarization pulses 220. For example, the nominal number of depolarization pulses may be two, 220A, 220B, and this number may be increased to three 220C, four 220D (not shown), five 220E (not shown), or even more (not shown), until the voltage difference DELTA Y is no longer larger than the V THRESHOLD value. This may be done at the individual cell level, where the number of depolarization pulses is adjusted independently for each cell. This may be also done at the battery level, where the worst case cell is determined and the number of depolarization pulses for all the cells is based upon the number of depolarization pulses required by the worst case cell.

In still another method, after the voltage difference DELTA Y is determined for each cell then the worst case cell is determined, and this voltage difference DELTA Y is compared with the V THRESHOLD value. Then the duration of the charge pulse 200 is adjusted based on the requirements of this worst case cell. In a variation of this method, the temperature of each cell is also considered, and the worst case cell is that cell which has the greatest difference between its DELTA Y and the V THRESHOLD value for that temperature.

In still another method, the voltage difference DELTA Y is determined for each cell and the worst case cell is determined. Then the amplitude of the charge pulse 200 is adjusted based on the requirements of the worst case cell. In a variation of this method, the temperature of each cell is also considered.

In still another method, the voltage difference DELTA Y is determined for each cell and the worst case cell is determined. Then the amplitude of the depolarization pulse 220 is adjusted based on the requirements of the worst case cell. In a variation of this method, the temperature of each cell is also considered.

In still another method, the voltage difference DELTA Y is determined for each cell and the worst case cell is determined. Then the duration of the charge pulse 200 and the amplitude of the depolarization pulse 220 are adjusted based on the requirements of the worst case cell. In a variation of this method, the temperature of each cell is also considered.

In still another method, the voltage difference DELTA Y is determined for each cell and the worst case cell is determined. Then the duration of the charge pulse 200 and the amplitude of the depolarization pulse 220 are adjusted based on the requirements of the worst case cell. In a variation of this method, the temperature of each cell is also considered.

In still another method, the voltage difference DELTA Y is determined for each cell and the cell with the lowest DELTA Y, the "best case" cell, is determined. In a variation of this method, the temperature of each cell is also considered, and the best case cell is that cell which has the least difference between its DELTA Y and the threshold value for that temperature. Then the amplitude of the primary charge pulse 200 is adjusted based on the requirements of the best case cell, and a portion of the primary charge pulse 200 is shunted around each cell, based on the state of charge of each individual cell.

In still another method, the voltage difference DELTA Y is determined for each cell and the worst case cell is determined. In a variation of this method, the temperature of each cell is also considered. Then the amplitude of the charging pulse 200 and the amplitude of the primary depolarization pulse 220 are adjusted based on the requirements of the best case cell, and a portion of the primary charge pulse 200 is shunted around each cell, based on the state of charge of each individual cell.

In still another method, the voltage difference DELTA Y is determined for each cell and the worst case cell is determined. In a variation of this method, the temperature of each cell is also considered. Then the amplitude of the depolarization pulse 220 for that worst case cell is increased based on the requirements of that worst case cell. In a variation, the amplitude of the depolarization pulse 220 for each other cell is adjusted based on the requirements of each individual cell.

In still another method, the voltage difference DELTA Y is determined for each cell and the best case cell is determined. In a variation of this method, the temperature of each cell is also considered. Then the amplitude of the depolarization pulse 220 for that best case cell is decreased based on the requirements of that best case cell. In a variation, the amplitude of the depolarization pulse 220 for each other cell is adjusted based on the requirements of each individual cell.

In still another method, the voltage difference DELTA Y is determined for each cell and the best case cell is determined. In a variation of this method, the temperature of each cell is also considered. Then the duration of the depolarization pulse 220 for that best case cell is decreased based on the requirements of that best case cell. In a variation, the duration of the depolarization pulse 220 for each other cell is adjusted based on the requirements of each individual cell.

As previously stated, the voltage difference DELTA Y responds quickly to changes in the charge cycle parameters: the amplitude, duration, number, frequency of the charging pulses 200 and the depolarization pulses 220, and the duration of the rest periods 205, 210. Therefore, these charge cycle parameters are preferably adjusted on a cycle-by-cycle basis by measuring DELTA Y in each charge cycle and adjusting the charge cycle parameters accordingly for the next charge cycle. In the preferred embodiment, the current provided by a charge pulse 200 is adjusted by a predetermined amount, such as 1 amp, each time a change in the charge pulse current is necessary. Alternatively, the charge pulse current may be adjusted by adjusting the duration of the charge pulse, such as in 10 millisecond steps. The current drawn by a depolarization pulse may be adjusted in a similar manner by varying the resistance of the load or the duration of the depolarization pulse. The charge cycle parameters may also be adjusted every N charge cycles, or every T milliseconds or seconds, etc. One may also use multiple thresholds to adjust the charge cycle parameters. Two or more thresholds allows the charge cycle parameters to be controlled more responsively to the condition of the cell. For example, if the charge pulse 200 current is the charge cycle variable parameter, and if two thresholds are used, then below a first threshold the charge pulse current is increased, between the first and a second threshold the charge pulse current is not changed, and above the second threshold the charge pulse current is decreased.

Of course, combinations of two or more of these methods may be used. For example, the charge pulse current may be increased to more quickly charge lesser charged cells, while more of the charge pulse current may be shunted around cells which are more fully charged. Likewise, the depolarization pulse current for one cell may be increased, and the number or the duration of depolarization pulses may be increased for another cell. Combinations of two or more of these methods provide for faster charging of all cells by charging each cell at the maximum rate that that particular cell can accept without damage.

It will be seen from FIG. 1 that the primary charge pulse parameters (primary parameters) for charging device 30 set the maximum values, but not the minimum values, for the charge pulse parameters for the individual cells. For example, the primary charge pulse parameters could be two pulses of 50 amps for 500 milliseconds for each pulse. However, by use of the equalization modules 12, the charge current from one charge pulse could be completely shunted around a cell, or the amplitude of a charge pulse could be lessened by shunting a part of the charge current from the charge pulse around the cell during all or part of the charge pulse, or a shorter charge pulse could be provided by shunting all of the charge pulse around a cell for part of the duration of the primary charge pulse, or a combination of these.

Similarly, the primary depolarization pulse parameters set the minimum values, but not the maximum values, for the depolarization parameters for the individual cells. For example, the primary depolarization pulse parameters could be one pulse of 50 amps for 2 milliseconds. However, by use of the equalization module 12, additional depolarization pulses may be provided to a selected cell or cells, or the amplitude or duration of a depolarization pulse may be increased, or a combination of these.

For a typical lead acid type cell having a voltage rating of 2.2 volts per cell and a capacity rating of 60 amp-hours, nominal values are as follows: the single primary charge pulse 200 is 60 amps for 500 milliseconds, the single primary depolarization pulse 220 is 120 amps for 3 milliseconds, and the rest periods 210 have durations of 7 to 10 milliseconds. Of course, it will be appreciated that the voltage and current values, and the number and durations of pulses, will depend upon the type of cell being charged (lithium, lead-acid, etc.) and the capacity rating of the cell (100 amp-hours, 500 amp-hours, etc.). These values will also depend upon the state of charge of the cell being charged and the temperature of the cell being charged.

The voltage measurements may be taken at any point in the rest periods 210, and may be taken at different points in different rest periods. However, in the preferred embodiment, the voltage measurements are taken at the beginning of the rest periods 210 and are taken at the same point with respect to the beginning of each rest period.

Therefore, the present invention provides for testing the state of charge of a cell and adjusting the rate of charge of the cell so that the cell is charged rapidly and without damage. Furthermore, cells in series are charged in a manner which prevents damage to cells when the cells have different states of charge. Thus, the present invention provides for equalization of the charges among the cells so that each cell is charged to its maximum capacity without damage and without being dependent upon whether another cell has a different initial state of charge or a different rate at which it can be charged.

Figure 3A:
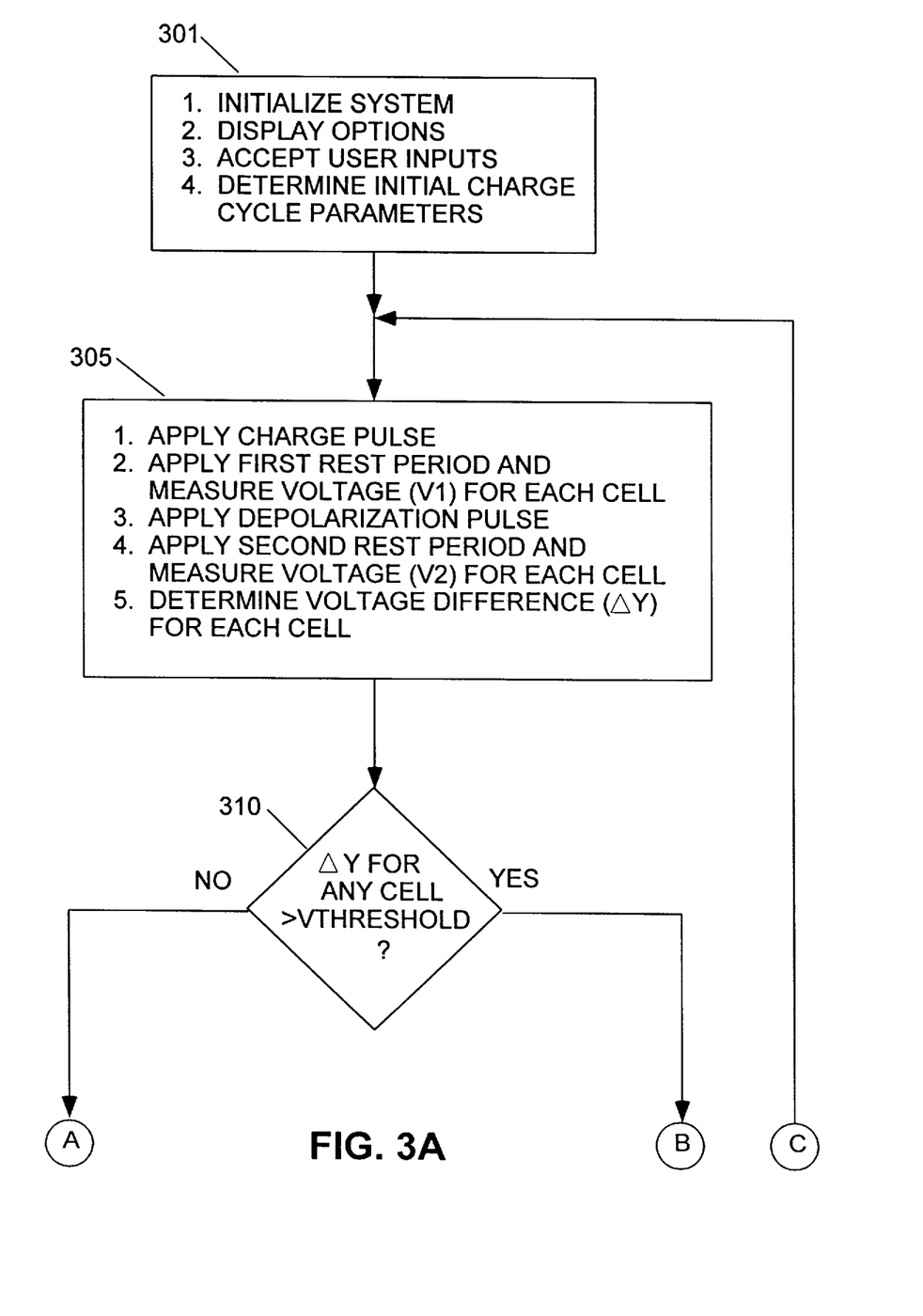
FIGS. 3A and 3B are a flow chart illustrating the process of determining the state of charge of the battery and adjusting the charging process accordingly.
Figure 3B:
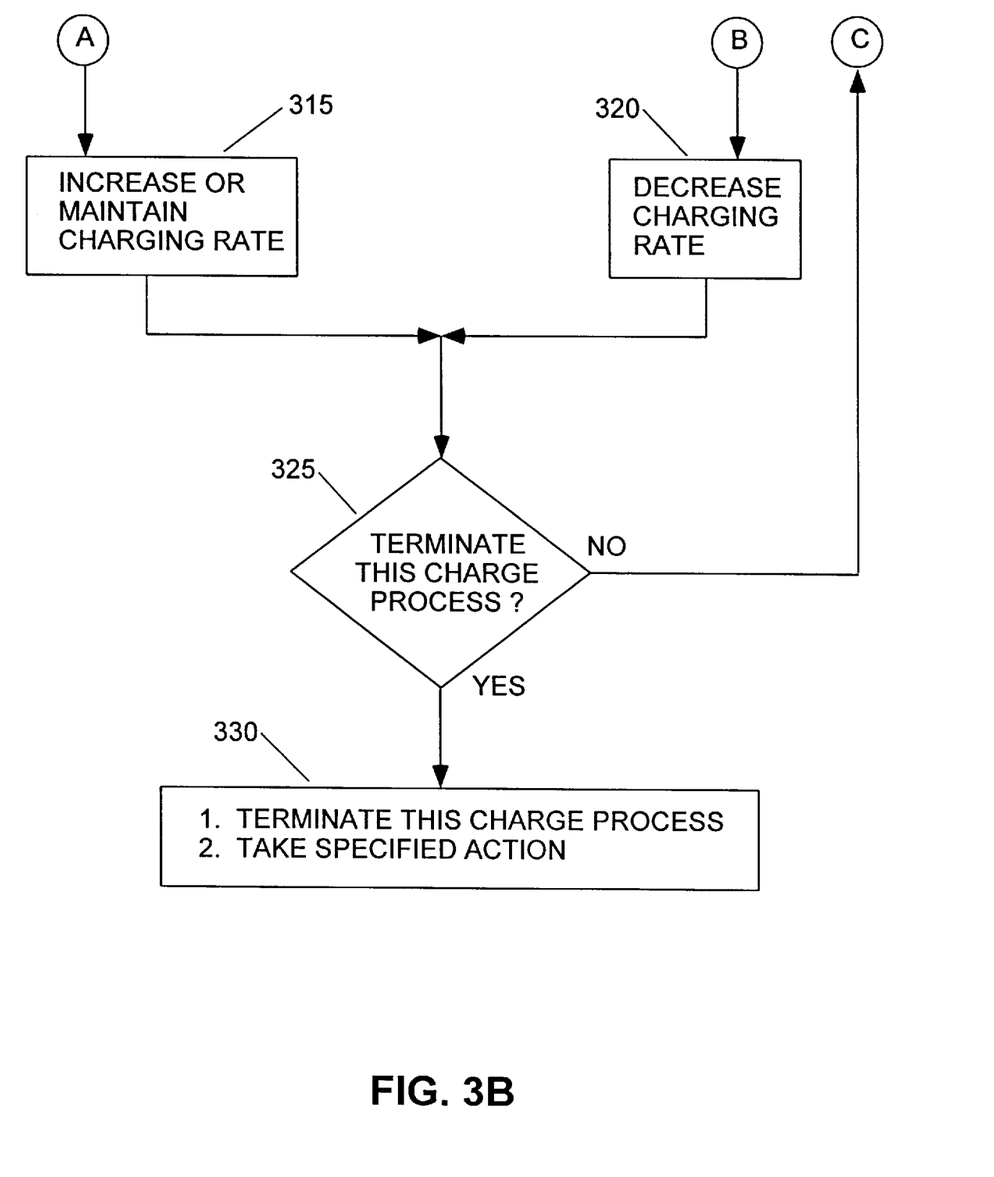

FIGS. 3A and 3B are a flow chart illustrating the process of determining the state of charge of the cells in a battery and adjusting the charging process accordingly. In the preferred embodiment, the controller 14 controls the process. However, other devices may also be used to control the process. In step 301, the battery information is provided by the user, such as the battery type, or the battery voltage, or the cell voltage and the number of cells (NC) in the battery, or the capacity rating (CR) of the battery, etc. The initial charge cycle parameters for the battery are then determined based upon this information. The initial charge cycle parameters may be based upon a look-up table or an equation, as preferred.

In step 305, a charge pulse 200 with the desired current amplitude and duration is applied to the battery, followed by a first rest period 210A of the desired duration, during which the first open circuit voltage measurement (V1) is made for each cell. Then a depolarization pulse 220A with the desired current amplitude and duration is applied to the battery. This is followed by a second rest period 210B of the desired duration, during which the second open circuit voltage measurement (V2) is made for each cell. As previously stated, the voltage measurements can be made at any point in a rest period 210, so long as all voltage measurements are taken at the same relative point with respect to the beginning of a rest period 210. The voltage difference DELTA Y for each cell is then determined.

Step 310 tests whether the voltage difference DELTA Y for any cell is greater than the threshold voltage (V THRESHOLD) for that cell. If not, then all the cells are not being charged at their maximum rates and so step 315 is executed next. In step 315 the charge cycle parameters are adjusted to increase the charging rate, such as by increasing the amplitude, duration or number of charge pulses, or decreasing the amplitude, duration or number of depolarization pulses, either for the entire battery and/or for that cell, depending upon the particular process being used. Alternatively, the charge cycle parameters may be maintained at their current settings. Although not shown, a second threshold may be used to determine whether to increase or maintain the rate of charge at this point. Then step 325 is executed.

If at step 310 the voltage difference DELTA Y for any cell is greater than the threshold voltage (V THRESHOLD) for that cell, then that cell is being overcharged or is being charged at a rate greater than that cell can properly accept and so step 320 is executed next. In step 320 the charge cycle parameters are adjusted to decrease the charging rate, such as by decreasing the amplitude, duration or number of charge pulses, or increasing the amplitude, duration or number of depolarization pulses, either for the battery as a whole and/or for that cell, depending upon the particular process being used. Then step 325 is executed.

In step 325 a determination is made whether to terminate the charging process. The charging process may be terminated for any one of several different reasons. For example, the charging time set by the user may have expired, or the battery temperature may be outside of an acceptable range, or the amplitude of the current provided during a charge pulse 200 may have been reduced to CR/10 or less. If this charging process is not terminated at step 325 then a return is made to step 305.

If a reason for termination of this charging process has occurred, then in step 330 this charging process will be terminated and a specified action is taken. For example, if appropriate for that type of battery and because termination occurred due to the charging current being less than CR/10, then trickle charging may be applied. As another example, no charging or discharging of any types may be executed if the termination occurred due to battery temperature. Also, a visual or audible indication of termination of the charge process may be provided to the operator.

Although the present invention has been described with particularity with respect to its preferred environment, the present invention is not limited to lithium and lead-acid cells. The present invention is also useful for other types of cells and batteries.

Further, the present invention is also useful for series-connected batteries in a battery pack. In this case, each battery is treated as a single "cell" and the battery pack is treated as a single "battery". The only difference is that a battery pack may require higher currents and/or voltages. In this case the temperature, the voltage difference DELTA Y, and the threshold voltage are determined at the battery level, rather than the cell level.

It will be appreciated from the above that the present invention provides a method for determining the state of charge of a cell. It will also be appreciated from the above that the present invention provides a method for adjusting the charge in a cell during a charging process so that all the cells in a battery have the same charge. It will also be appreciated from the above that the present invention provides a method for equalizing all the cells in a battery so that all the cells have the same charge.

From a reading of the description above of the preferred embodiment of the present invention, modifications and variations thereto may occur to those skilled in the art. Therefore, the scope of the present invention is to be limited only by the claims below.

We claim:

1. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration, each said energy storage device receiving a portion of said charging pulse which is independent of a portion of said charging pulse received by any other energy storage device;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

for each said energy storage device, determining a voltage difference between said voltage at said predetermined point within said preceding rest period and said voltage at said predetermined point within said following rest period;

comparing each said voltage difference with a threshold voltage;

if any of said voltage differences is greater than said threshold voltage then performing at least one of the following: decreasing said amplitude of said series charging current, decreasing said duration of said series charging current, decreasing a number of said charging pulses which occur without an intervening said depolarization pulse, increasing said duration of at least one said rest period, increasing said amplitude of said discharge current, increasing said duration of said discharge current, or increasing a number of said depolarization pulses which occur without an intervening said charging pulse;

for at least one said energy storage device which has a said voltage difference greater than said threshold voltage, performing at least one of the following: decreasing said amplitude of said portion of said series charging current received by said energy storage device, decreasing said duration of said portion of said series charging current received by said energy storage device, or decreasing a number of said charging pulses of said portion of said series charging current received by said energy storage device which occur without an intervening said depolarization pulse; and repeating the above steps.

2. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

applying a specific depolarization pulse to at least one said energy storage device during at least one of said depolarization pulses applied to said set, a said specific depolarization pulse drawing an additional discharge current having an amplitude and a duration from said energy storage device to which it is applied;

for each said energy storage device, measuring the voltage of said energy storage device at a predetermined point within a said rest period following said predetermined depolarization pulse;

for each said energy storage device, determining a voltage difference between said voltage at said predetermined point within said preceding rest period and said voltage at said predetermined point within said following rest period;

comparing each said voltage difference with a threshold voltage;

if any of said voltage differences is greater than said threshold voltage then performing at least one of the following: decreasing said amplitude of said series charging current, decreasing said duration of said series charging current, decreasing a number of said charging pulses which occur without an intervening said depolarization pulse, increasing said duration of at least one said rest period, increasing said amplitude of said discharge current, increasing said duration of said discharge current, or increasing a number of said depolarization pulses which occur without an intervening said charging pulse;

for at least one said energy storage device which has a said voltage difference greater than said threshold voltage, performing at least one of the following: increasing said amplitude of said discharge current specific depolarization pulse, increasing said duration of said discharge current specific depolarization pulse, or increasing a number of said specific depolarization pulses which occur without an intervening said charging pulse; and repeating the above steps.

3. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration, each said energy storage device receiving a portion of said charging pulse which is independent of a portion of said charging pulse received by any other energy storage device;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

for each said energy storage device, determining a voltage difference between said voltage at said predetermined point within said preceding rest period and said voltage at said predetermined point within said following rest period;

comparing each said voltage difference with a threshold voltage;

for at least one said energy storage device which has a said voltage difference greater than said threshold voltage, performing at least one of the following: decreasing said amplitude of said portion of said series charging current received by said energy storage device, decreasing said duration of said portion of said series charging current received by said energy storage device, or decreasing a number of said charging pulses of said portion of said series charging current received by said energy storage device which occur without an intervening said depolarization pulse; and repeating the above steps.

4. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

applying a specific depolarization pulse to at least one said energy storage device during at least one of said depolarization pulses applied to said set, a said specific depolarization pulse drawing an additional discharge current having an amplitude and a duration from said energy storage device to which it is applied;

for each said energy storage device, determining a voltage difference between said voltage at said predetermined point within said preceding rest period and said voltage at said predetermined point within said following rest period;

comparing each said voltage difference with a threshold voltage;

for at least one said energy storage device which has a said voltage difference greater than said threshold voltage, performing at least one of the following: increasing said amplitude of said discharge current specific depolarization pulse, increasing said duration of said discharge current specific depolarization pulse, or increasing a number of said specific depolarization pulses which occur without an intervening said charging pulse; and repeating the above steps.

5. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration, each said energy storage device receiving a portion of said charging pulse which is independent of a portion of said charging pulse received by any other energy storage device;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

applying a specific depolarization pulse to at least one said energy storage device during at least one of said depolarization pulses applied to said set, a said specific depolarization pulse drawing an additional discharge current having an amplitude and a duration from said energy storage device to which it is applied;

for each said energy storage device, determining a voltage difference between said voltage at said predetermined point within said preceding rest period and said voltage at said predetermined point within said following rest period;

comparing each said voltage difference with a threshold voltage;

for at least one said energy storage device which has a said voltage difference greater than said threshold voltage, performing at least one of the following: decreasing said amplitude of said portion of said series charging current received by said energy storage device, decreasing said duration of said portion of said series charging current received by said energy storage device, decreasing a number of said charging pulses of said portion of said series charging current received by said energy storage device which occur without an intervening said depolarization pulse, increasing said amplitude of said discharge current specific depolarization pulse, increasing said duration of said discharge current specific depolarization pulse, or increasing a number of said specific depolarization pulses which occur without an intervening said charging pulse; and repeating the above steps.

6. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

for each said energy storage device, determining a voltage difference between said voltage at said predetermined point within said preceding rest period and said voltage at said predetermined point within said following rest period;

comparing each said voltage difference with a threshold voltage;

if none of said voltage differences is greater than said threshold voltage then performing at least one of the following: increasing said amplitude of said series charging current, increasing said duration of said series charging current, increasing a number of said charging pulses which occur without an intervening said depolarization pulse, decreasing said duration of at least one said rest period, decreasing said amplitude of said discharge current, decreasing said duration of said discharge current, or decreasing a number of said depolarization pulses which occur without an intervening said charging pulse; and repeating the above steps.

7. A method for equalizing the charge among a plurality of series-connected energy storage devices in a set of said energy storage devices, comprising the steps of:

applying at least one charging pulse to said set, a said charging pulse providing a series charging current, said series charging current having an amplitude and a duration, each said energy storage device receiving a portion of said charging pulse which is independent of a portion of said charging pulse received by any other energy storage device;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

for each said energy storage device, determining a voltage difference between said voltage at said predetermined point within said preceding rest period and said voltage at said predetermined point within said following rest period;

comparing each said voltage difference with a threshold voltage;

if none of said voltage differences is greater than said threshold voltage then performing at least one of the following:

increasing said amplitude of said series charging current, increasing said duration of said series charging current, increasing a number of said charging pulses which occur without an intervening said depolarization pulse, decreasing said duration of at least one said rest period, decreasing said amplitude of said discharge current, decreasing said duration of said discharge current, or decreasing a number of said depolarization pulses which occur without an intervening said charging pulse;

for at least one said energy storage device which has a said voltage difference greater than said threshold voltage, performing at least one of the following: decreasing said amplitude of said portion of said series charging current received by said energy storage device, decreasing said duration of said portion of said series charging current received by said energy storage device, or decreasing a number of said charging pulses of said portion of said series charging current received by said energy storage device which occur without an intervening said depolarization pulse; and repeating the above steps.

8. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

applying a specific depolarization pulse to at least one said energy storage device during at least one of said depolarization pulses applied to said set, a said specific depolarization pulse drawing an additional discharge current having an amplitude and a duration from said energy storage device to which it is applied;

for each said energy storage device, determining a voltage difference between said voltage at said predetermined point within said preceding rest period and said voltage at said predetermined point within said following rest period;

comparing each said voltage difference with a threshold voltage;

if none of said voltage differences is greater than said threshold voltage then performing at least one of the following: increasing said amplitude of said series charging current, increasing said duration of said series charging current, increasing a number of said charging pulses which occur without an intervening said depolarization pulse, decreasing said duration of at least one said rest period, decreasing said amplitude of said discharge current, decreasing said duration of said discharge current, or decreasing a number of said depolarization pulses which occur without an intervening said charging pulse;

for at least one said energy storage device, performing at least one of the following: increasing said amplitude of said discharge current specific depolarization pulse, increasing said duration of said discharge current specific depolarization pulse, or increasing a number of said specific depolarization pulses which occur without an intervening said charging pulse; and repeating the above steps.

9. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration, each said energy storage device receiving a portion of said charging pulse which is independent of a portion of said charging pulse received by any other energy storage device;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

for each said energy storage device, determining a voltage difference between said voltage at said predetermined point within said preceding rest period and said voltage at said predetermined point within said following rest period;

comparing each said voltage difference with a threshold voltage;

for at least one said energy storage device which has a voltage difference less than said threshold voltage, performing at least one of the following: increasing said amplitude of said portion of said series charging current received by said energy storage device, increasing said duration of said portion of said series charging current received by said energy storage device, or increasing a number of said charging pulses of said portion of said series charging current received by said energy storage device which occur without an intervening said depolarization pulse; and repeating the above steps.

10. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

applying a specific depolarization pulse to at least one said energy storage device during at least one of said depolarization pulses applied to said set, a said specific depolarization pulse drawing an additional discharge current having an amplitude and a duration from said energy storage device to which it is applied;

for each said energy storage device, determining a voltage difference between said voltage at said predetermined point within said preceding rest period and said voltage at said predetermined point within said following rest period;

comparing each said voltage difference with a threshold voltage;

for at least one said energy storage device which has a voltage difference less than said threshold voltage, performing at least one of the following: decreasing said amplitude of said discharge current specific depolarization pulse, decreasing said duration of said discharge current specific depolarization pulse, or decreasing a number of said specific depolarization pulses which occur without an intervening said charging pulse; and repeating the above steps.

11. A method for equalizing the charge among a plurality of series-connected energy storage devices in a set of said energy storage devices, comprising the steps of:

applying at least one charging pulse to said set, said charging pulse providing a series charging current, said series charging current having an amplitude and a duration, each said energy storage device receiving a portion of said charging pulse which is independent of a portion of said charging pulse received by any other energy storage device;

applying a plurality of depolarization pulses to said set, said depolarization pulses each drawing a discharge current having an amplitude and a duration, said depolarization pulses being separated from each other by rest periods, each said rest period having a duration;

for each said energy storage device, measuring the voltage of said energy storage device at a predetermined point within a said rest period preceding a predetermined said depolarization pulse;

for each said energy storage device, measuring the voltage of said energy storage device at a predetermined point within a said rest period following said predetermined depolarization pulse;

applying a specific depolarization pulse to at least one said energy storage device during at least one of said depolarization pulses applied to said set, a said specific depolarization pulse drawing an additional discharge current having an amplitude and a duration from said energy storage device to which it is applied;

for each said energy storage device, determining a voltage difference between said voltage at said predetermined point within said preceding rest period and said voltage at said predetermined point within said following rest period;

comparing each said voltage difference with a threshold voltage;

for at least one said energy storage device which has a voltage difference less than said threshold voltage, performing at least one of the following: increasing said amplitude of said portion of said series charging current received by said energy storage device, increasing said duration of said portion of said series charging current received by said energy storage device, increasing a number of said charging pulses of said portion of said series charging current received by said energy storage device which occur without an intervening said depolarization pulse, decreasing said amplitude of said discharge current specific depolarization pulse, decreasing said duration of said discharge current specific depolarization pulse, or decreasing a number of said specific depolarization pulses which occur without an intervening said charging pulse; and repeating the above steps.

12. The method of any one of claims 1–11, and further comprising the steps of:

measuring the temperature of each said energy storage device;

determining a threshold voltage for each said energy storage device based upon said temperature of said energy storage device; and wherein said step of comparing each said voltage difference with a threshold voltage comprises comparing said voltage difference for said energy storage device with said threshold voltage determined by said temperature of said energy storage device.

13. The method of any one of claims 1–11, and further comprising the steps of:

measuring the temperature of said set of energy storage devices;

determining a threshold voltage based upon said temperature of said set of energy storage devices; and wherein said step of comparing each said voltage difference with a threshold voltage comprises comparing said voltage difference for said energy storage devices with said threshold voltage determined by said temperature of said set of energy storage devices.

* * * * *